US012100267B2

(12) United States Patent
Wyllie et al.

(10) Patent No.: US 12,100,267 B2
(45) **Date of Patent: *Sep. 24, 2024**

(54) QUARANTINED WALLET ACCESS FOR A MOBILE WALLET

(71) Applicant: Aristocrat Technologies Australia Pty Limited, North Ryde (AU)

(72) Inventors: Andrew Wyllie, North Ryde (AU); Alan Wong, West Pennant Hills (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,292

(22) Filed: Jun. 6, 2023

(65) Prior Publication Data

US 2023/0316859 A1 Oct. 5, 2023

Related U.S. Application Data

(63) Continuation of application No. 17/811,827, filed on Jul. 11, 2022, now Pat. No. 11,710,374, which is a continuation of application No. 16/948,608, filed on Sep. 24, 2020, now Pat. No. 11,386,751, which is a continuation-in-part of application No. 16/787,917, filed on Feb. 11, 2020, now Pat. No. 11,074,779, and a continuation-in-part of application No. 16/774,088, filed on Jan. 28, 2020, now Pat. No. 11,210,893.

(30) Foreign Application Priority Data

Sep. 25, 2019 (AU) ................................ 2019903596

(51) Int. Cl.
*G07F 17/32* (2006.01)

(52) U.S. Cl.
CPC ................................ *G07F 17/3244* (2013.01)

(58) Field of Classification Search
CPC .................................................. G07F 17/3244
See application file for complete search history.

(56) References Cited

U.S. PATENT DOCUMENTS 8,216,072 B2 7/2012 Curtis
8,622,836 B2 1/2014 Nelson
9,306,952 B2 4/2016 Burman
(Continued)

OTHER PUBLICATIONS

Office Action dated Mar. 16, 2021 for U.S. Appl. No. 16/787,917 (pp. 1-12).

(Continued)

*Primary Examiner* — Werner G Garner
(74) *Attorney, Agent, or Firm* — Weaver Austin Villeneuve & Sampson LLP

(57) ABSTRACT

A quarantine wallet associated with a user account that support funds to be quarantined for a defined period. A user account server determines that a respective win amount satisfies one or more funds quarantine criteria and removes at least a portion of the win amount satisfying the one or more funds quarantine criteria from access by one or more wallets associated with a user account. The user account server stores the removed portion of the win amount as a quarantined fund amount in a quarantine wallet associated with the user account. The user account server sets a release time for the quarantined funds amount in the quarantine wallet and performs a transfer of the quarantined funds amount to the one or more wallets based on satisfying the release time.

20 Claims, 11 Drawing Sheets

(56) References Cited

U.S. PATENT DOCUMENTS

| | | | |
|---|---|---|---|
| 9,472,049 | B2 | 10/2016 | Allen |
| 9,666,021 | B2 | 5/2017 | Nguyen |
| 9,754,443 | B2 | 9/2017 | Hedrick |
| 9,805,547 | B2 | 10/2017 | Price |
| 10,121,312 | B2 | 11/2018 | Allen |
| 10,391,392 | B2 | 8/2019 | Nelson |
| 2003/0013532 | A1 | 1/2003 | Rowe |
| 2003/0022719 | A1 | 1/2003 | Donald |
| 2006/0211493 | A1 | 9/2006 | Walker |
| 2010/0106611 | A1 | 4/2010 | Paulsen |
| 2014/0200065 | A1 | 7/2014 | Anderson |
| 2015/0235521 | A1 | 8/2015 | Lutnick |
| 2016/0093166 | A1 | 3/2016 | Panambur |
| 2019/0043306 | A1 | 2/2019 | Higgins |

OTHER PUBLICATIONS

Notice of Allowance dated Jun. 16, 2021 for U.S. Appl. No. 16/787,917 (pp. 1-8).
Office Action (Non-Final Rejection) dated Jul. 19, 2021 for U.S. Appl. No. 16/774,088 (pp. 1-17).
Office Action (Notice of Allowance and Fees Due (PTOL-85)) dated Sep. 1, 2021 for U.S. Appl. No. 16/774,088 (pp. 1-9).
Office Action (Non-Final Rejection) dated Sep. 23, 2021 for U.S. Appl. No. 16/948,608 (pp. 1-13).
Office Action (Notice of Allowance and Fees Due (PTOL-85)) dated Nov. 9, 2021 for U.S. Appl. No. 16/774,088 (pp. 1-8).
Office Action (Notice of Allowance and Fees Due (PTOL-85)) dated Mar. 14, 2022 for U.S. Appl. No. 16/948,608 (pp. 1-12).
Office Action (Non-Final Rejection) dated Aug. 12, 2022 for U.S. Appl. No. 17/371,569 (pp. 1-5).
Office Action (Non-Final Rejection) dated Sep. 26, 2022 for U.S. Appl. No. 17/491,020 (pp. 1-6).
Office Action (Notice of Allowance and Fees Due (PTOL-85)) dated Nov. 4, 2022 for U.S. Appl. No. 17/491,020 (pp. 1-8).
Office Action (Notice of Allowance and Fees Due (PTOL-85)) dated Nov. 14, 2022 for U.S. Appl. No. 17/371,569 (pp. 1-8).
Office Action (Non-Final Rejection) dated Dec. 15, 2022 for U.S. Appl. No. 17/811,827 (pp. 1-10).
Office Action (Notice of Allowance and Fees Due (PTOL-85)) dated Mar. 6, 2023 for U.S. Appl. No. 17/811,827 (pp. 1-11).
Office Action (Non-Final Rejection) dated Jul. 11, 2023 for U.S. Appl. No. 17/543,345 (pp. 1-13).
Office Action (Non-Final Rejection) dated Aug. 21, 2023 for U.S. Appl. No. 18/160,854 (pp. 1-6).
Office Action (Non-Final Rejection) dated Sep. 7, 2023 for U.S. Appl. No. 18/160,842 (pp. 1-6).
Australian Examination Report No. 2 issued in App. No. AU2019232826, dated Oct. 2, 2023, 4 pages.
Office Action (Non-Final Rejection) dated Nov. 14, 2023 for U.S. Appl. No. 17/543,345 (pp. 1-5).
Office Action (Notice of Allowance and Fees Due (PTOL-85)) dated Dec. 4, 2023 for U.S. Appl. No. 18/160,842 (pp. 1-7).
Office Action (Notice of Allowance and Fees Due (PTOL-85)) dated Dec. 1, 2023 for U.S. Appl. No. 18/160,854 (pp. 1-7).
Office Action (Notice of Allowance and Fees Due (PTOL-85)) dated Feb. 13, 2024 for U.S. Appl. No. 17/543,345 (pp. 1-7).

QUARANTINED WALLET ACCESS FOR A MOBILE WALLET

CROSS REFERENCE TO RELATED APPLICATIONS

This application is a continuation under 35 U.S.C. § 120 of U.S. patent application Ser. No. 17/811,827, filed Jul. 11, 2022, and titled "Quarantined Wallet Access for a Mobile Wallet," which is itself a continuation under 35 U.S.C. § 120 of U.S. patent application Ser. No. 16/948,608, filed Sep. 24, 2020, titled "Quarantined Wallet Access for a Mobile Wallet" and issued as U.S. Pat. No. 11,386,751, on Jul. 12, 2022, which itself claimed the benefit of priority to Australian Provisional Patent Application Ser. No. 2019903596, filed Sep. 25, 2019 and entitled "A Gaming System with Quarantined Wallet Access," and was also a continuation-in-part of U.S. patent application Ser. No. 16/787,917, filed Feb. 11, 2020 and a continuation-in-part of U.S. patent application Ser. No. 16/774,088, filed Jan. 28, 2020. All applications recited above are hereby incorporated by reference herein in their entireties and for all purposes.

FIELD

The present application relates to implementing and providing mobile wallet access. More particularly, but not by way of limitation, this disclosure relates to performing gaming operations that present and provide quarantined wallet access for a mobile wallet.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

In larger venues, systems are provided that enable additional functionality to be provided alongside gaming machines. For example, player tracking systems offer a venue to track a player's play and provide additional rewards to players based on factors such as the amount the player wagers or how frequently they wager.

Player tracking systems provides support for a user to establish an account and transfer credits to the gaming machine and back to the player account. In some implementations, a player marketing module is provided at the gaming machine. After a player enters a player tracking card, the player marketing module communicates with a player tracking module, which communicates with the player tracking system to cause a download of the balance associated with the player account to the player marketing module. The player marketing module then adds the downloaded account balance to the credit meter of the gaming machine. When the player removes the player tracking card at the end of a gaming session, the player marketing module removes the credits from the gaming machine and sends them to the player tracking system for storage as a currency value in the player account.

SUMMARY

Implementations are provided with additional functionality within a user account that support funds to be quarantined with the user account for a defined time period in response to a condition being met in respect of a win amount. For example, if the win is above a defined level. In example implementations, the funds are stored in a quarantine wallet until the time period expires.

In an implementation, a method is disclosed that controls and provides funds in a gaming system. The method involves monitoring play of a game by a user within the gaming system, wherein play of the game involves the user wagering funds and a win amount can result from play of the game. The method involves determining that a respective win amount satisfies a funds quarantine criterion, removing at least a portion of the win amount satisfying the funds quarantine criterion from access by the user for wagering, storing the removed at least a portion of the win amount as a quarantined funds amount, setting a release time for the quarantined funds amount, and preventing the mobile wallet from initiating a fund transfer of the quarantined funds amount for wagering until the release time.

Another implementation provides a gaming system operable by a user to play a game, wherein play of the game involves the user wagering funds and a win amount can result from play of the game. The gaming system monitors play of the game by the user. When the gaming system determines that a respective win amount satisfies a funds quarantine criterion, the gaming system removes at least a portion of the win amount satisfying the funds quarantine criterion from access by the user for wagering. The gaming system stores the removed at least a portion of the win amount as a quarantined funds amount, sets a release time for the quarantined funds amount, and preventing the mobile wallet from initiating a fund transfer of the quarantined funds amount for wagering until the release time.

In one or more implementations, each of the above described methods, systems, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

DETAILED DESCRIPTION

The disclosure includes various implementations that present and provide a mobile wallet that integrates an external mobile wallet provider with a gaming wallet that transfer funds to slot machines, table games, and/or other game types within a casino. Specifically, the mobile wallet links a main wallet to a gaming wallet after a user successfully registers with the external mobile wallet provider. By linking the main wallet with the gaming wallet, the mobile wallet can define funds held in the main wallet to transfer down to the gaming wallet for gaming activities or vice versa. The mobile wallet can also interact with a quarantine wallet, which can be part of the gaming wallet or separate from the gaming wallet. The quarantine wallet holds funds for a defined period to prevent the gaming wallet and/or main wallet from accessing the funds. Depending on certain criteria that an operator defines, an account server classifies win amounts from one or more game types (e.g., slot machines) to be quarantined amounts that can be released after satisfying a certain release time. When the account server receives a request from the mobile wallet to release the quarantined amounts, the account server checks whether the release time has expired. In one or more implementations, the account server may set multiple release times for multiple quarantined amounts.

In terms of technical effects, implementations described throughout the disclosure delivers improvements to the disbursement of funds while complying with regulatory constraints. As an example, in some jurisdictions, wins above a certain amount or falling into a specific category must be paid by cheque. The payment by cheque provides an expected delay where users are unable to access the funds until after the funds have been deposited and the cheque has been cleared. In other words, the cheque in effect provides a desired and/or required delay before the user can spend the funds on gaming activities. By incorporating a quarantine wallet accessible by a mobile wallet, operators can define and customize such targeted delays before quarantined funds are transferred to a gaming wallet and/or main wallet. For example, operators can set one or more system level criteria, such as win amount, EGM type, EGM identity, area of venue, and/or type of win, to calculate a targeted delay. Additionally, or alternatively, the mobile wallet may support users setting their own criteria on when certain funds and/or winning amounts are transferred to the quarantine wallet. These and other technical features are described in greater detail later in the disclosure.

Figure 1:
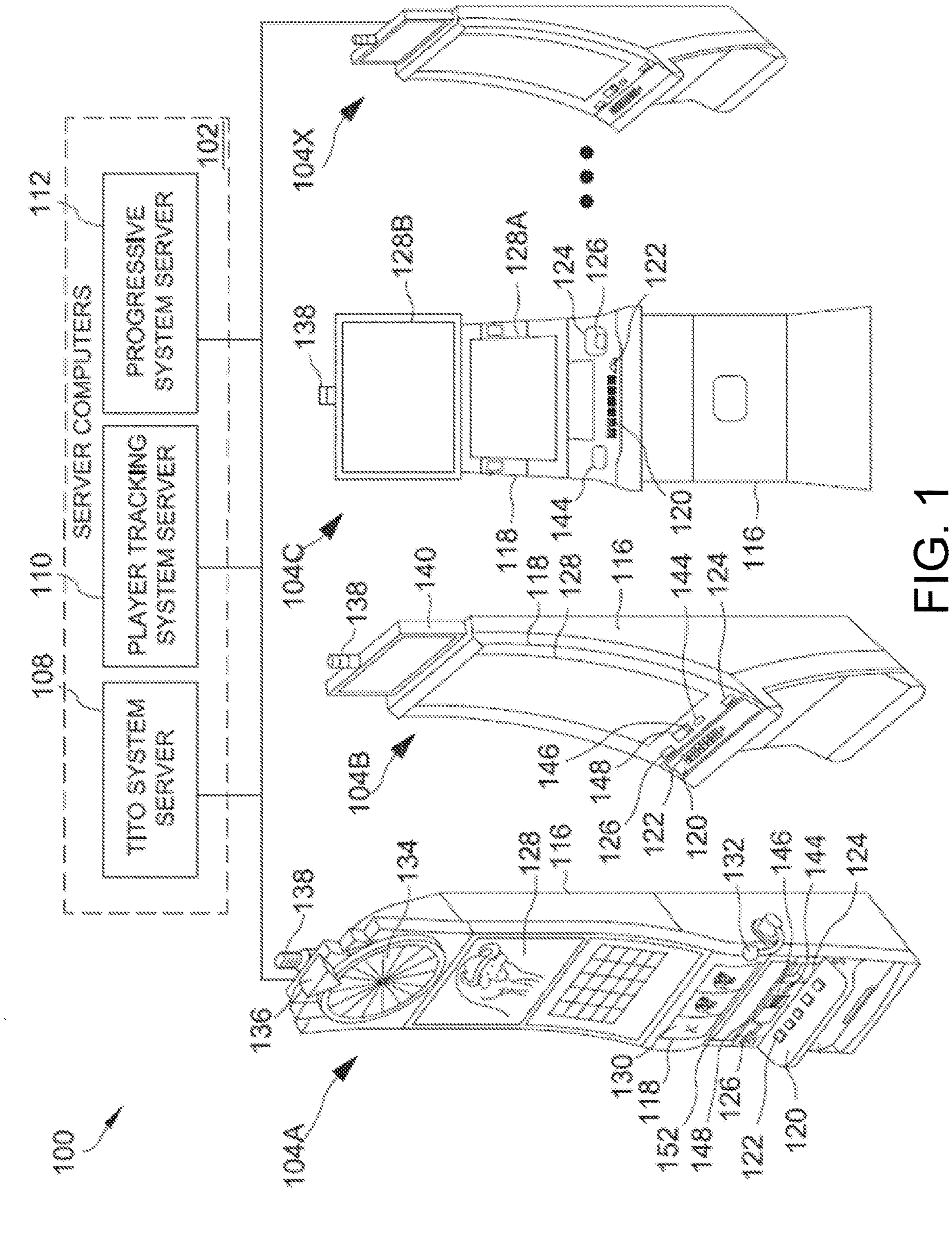
FIG. 1 is an exemplary diagram showing several EGMs networked with various gaming related servers.

FIG. 1 illustrates several different models of EGMs 104 which may be networked to various gaming related servers of a casino management system 102 to form a gaming system 100. Gaming devices 104A-104X can be slot machines, video poker machines, bingo machines, etc. The gaming devices 104A-104X can communicate with the casino management system 102 using one or more networking protocols, for example via an Ethernet or using a multi-drop floor protocol. The casino management system 102 may include, a ticket-in-ticket-out (TITO) system server 108, a player tracking system server 110, and/or a progressive system server 112. Although not explicitly shown in FIG. 1, the casino management system 102 could include other server computers.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126. FIG. 1 also illustrates that gaming device 104A could also include a handle 132 typically mounted to the side of main cabinet 116 which may be used to initiate game play.

In FIG. 1, gaming device 104A is shown as a Relm XL™ model gaming device manufactured by Aristocrat® Technologies, Inc. As shown, gaming device 104A is a reel machine having a gaming display arca 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game. In implementations where the reels are mechanical, mechanisms can be employed to implement greater functionality. For example, the boundaries of the gaming display arca boundaries of the gaming display arca 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display arca 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some implementations a ticket reader can be used which is only capable of reading tickets. In some implementations, a different form of token can be used to store a cash value, such as a magnetic stripe card.

In some implementations, a player tracking card reader 144, a transceiver for wireless communication with a player's smartphone, a keypad 146, and/or an illuminated display 148 for reading, receiving, entering, and/or displaying player tracking information is provided in EGM 104A. In such implementations, a game controller within the gaming device 104A can communicate, using a player tracking module, with the player tracking system server 110 to send and receive player tracking information. In one or more implementations, the player tracking card reader 144 can be part of the player tracking module.

Although not explicitly shown in FIG. 1, in an implementation, corresponding functionality can be provided by a player marketing module that also includes a transceiver for wireless communication with a player's mobile device (e.g., smartphone or tablet), a keypad and/or an illuminated display 148 for reading, receiving, entering, and/or displaying player tracking information. The player marketing module can communicate with a player tracking module or can be part of the player tracking module. As such, in addition to communicating with the player's mobile device, the player marketing module can communicate with both the player tracking system and the game controller within the related gaming devices. In some examples, the player marketing module may be configured to place communications onto a bus of the EGM and/or intercept communications placed on the bus by the game controller. An advantage of a separate player marketing module that connects to the player tracking module is that a venue that uses gaming machines from a number of manufacturers and/or older gaming machines can provide common player tracking interface across a fleet of gaming machines.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Figure 2:
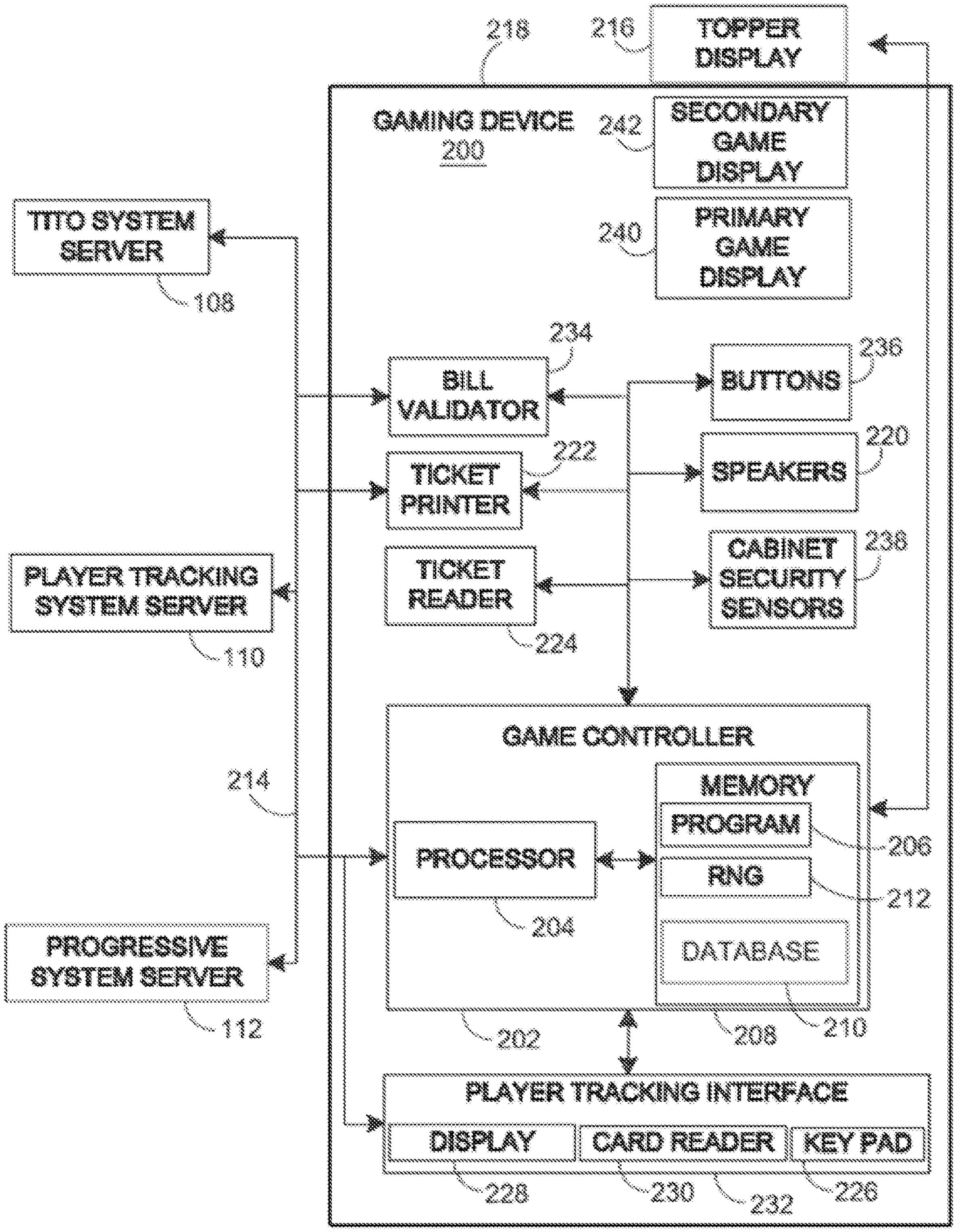
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2. Note that not all gaming devices suitable for implementing implementations of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, topper screen 140 may also or alternatively be used to display progressive jackpot prizes available to a player during play of gaming device 104B.

Example gaming device 104B includes a main cabinet 116 with a main door that opens to provide access to the interior of the gaming device 104B. The main or service door is typically used by service personnel to refill the ticket-out printer 126 and collect bills and tickets inserted into the bill validator 124. The main or service door may also be accessed to reset the machine, verify, and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some implementations, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some implementations, the RNG 212 is a pseudo-RNG.

Alternatively, a game instance, which can also be referenced as a play or round of the game, may be generated on a remote gaming device such as a central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Again, as described above, the player tracking interface could be replaced by a standalone player marketing module. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seck to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed. In an implementation, inserting a loyalty card also permits the player to transfer funds from a central account stored within the player tracking system server 110 to an EGM 104.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other input device which enables a player to input information into the gaming device 200. In some implementations, a player's selection may apply across a plurality of game instances. For example, if the player is awarded additional game instances in the form of free games, the player's prior selection of the amount bet per line and the number of lines played may apply to the free games. The selections available to a player will vary depending on the implementation. For example, in some implementations a number of pay lines may be fixed. In other implementations, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1). When the player is done, he/she cashes out the credit balance (typically by pressing a cash out button to receive a ticket from the ticket printer 222). The ticket may be "cashed-in" for money or inserted into another machine to establish a credit balance for play.

In one or more implementations, the player tracking interface 232 could include or is connected to a player marketing module that initiates communication and/or communicates with a player's mobile device, the gaming device 200, and/or the player tracking system server 110. With reference to FIGS. 1 and 2 as an example, the player marketing module could include a Bluetooth® beacon that broadcasts a beacon identifier (e.g., a default identifier) detectable by a player's mobile device. When the player marketing module detects a connectivity request from the player's mobile device, the player marketing module transmits a beacon identifier request to the player tracking system server 110 or more generally to the casino management system 102 shown FIG. 1. The player tracking system server 110 generates a custom beacon identifier and associates the player's mobile device and the player marketing module with the custom beacon identifier. After authenticating and establishing a tracked session on the player's mobile device, in one implementation, the player's mobile device subsequently communicates with the player tracking system server 110 using a separate network connection (e.g., WiFi® network) and does not communicate with the player marketing module. In another implementation, the player's mobile device establishes a direct connection (e.g., a pairing connection) with the player marketing module to communicate with the player tracking system server 110. Once establishing a tracked session, the player's mobile device can initiate the transfer of funds between the gaming device 200 and multiple wallets stored on an account server within the player tracking system server 110. The transfer of funds to the gaming device 200 occurs without requiring a player to present a loyalty club card.

The disclosure generally describes the use of a mobile wallet that initiates a transfer funds between a gaming device and one or more wallets using a player marketing module. Although the player marketing module is typically connected to and/or integrated with a player tracking system, the disclosure does not limit the player marketing module to these implementations. As an example, the player marketing module may be connected to and/or integrated with bill validator 234, which is independent of the player tracking system. By connecting and/or integrating with bill validator 234, the player marketing module can transfer funds without communicating with player tracking system server 110 and/or a casino management system 102 shown in FIG. 1. Instead, the player marketing module facilitates communication and/or communicates with server or database that is separate from and external to player tracking system server 110 and/or the casino management system 102 shown in FIG. 1. The separate server or database would include the account server that manages and stores the one or more wallets that the player's mobile device can access using the mobile wallet.

Figure 3:
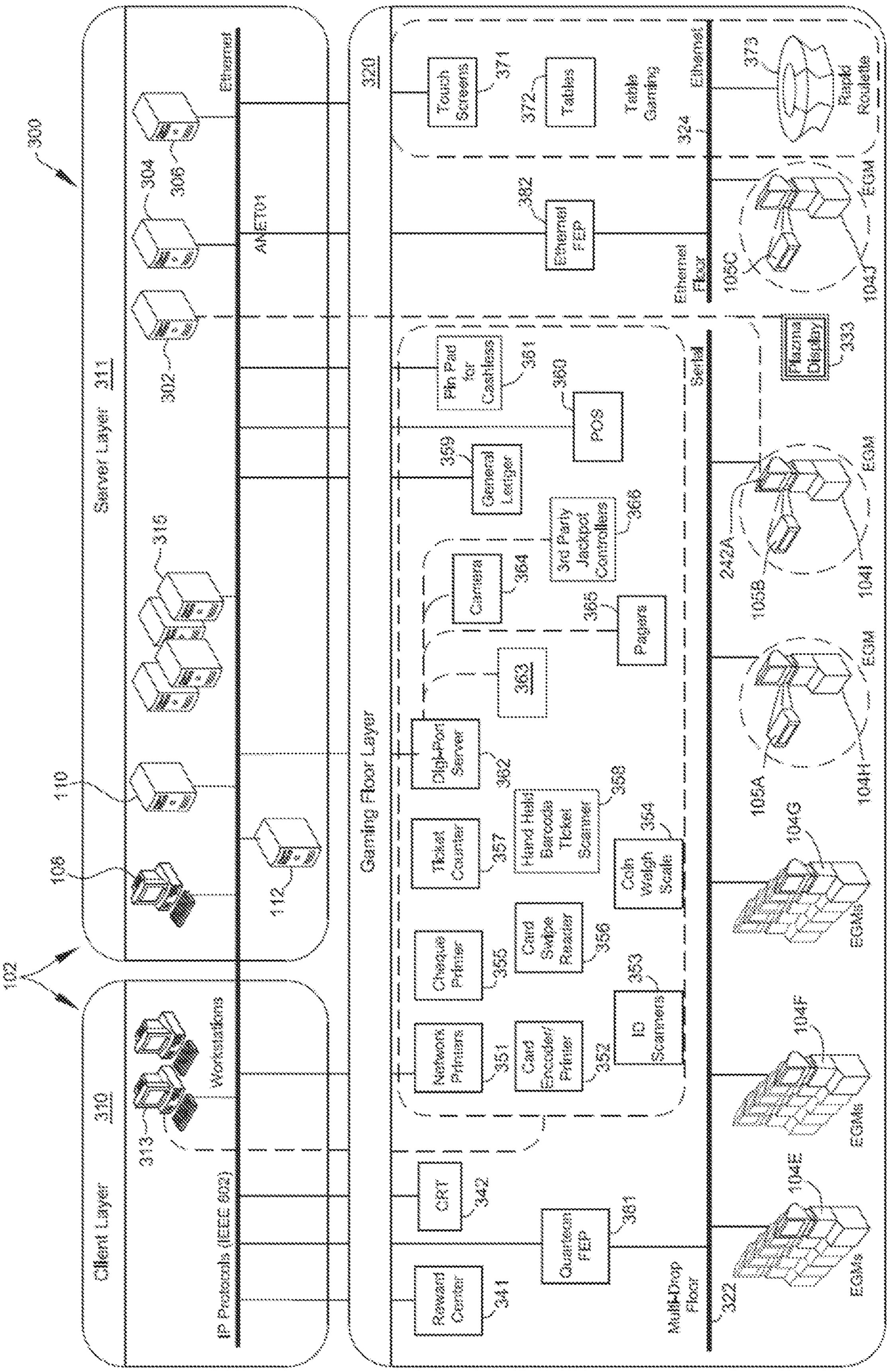
FIG. 3 is an exemplary diagram of a venue architecture.

FIG. 3 shows an example venue architecture 300. In FIG. 3 example functions provided by the server layer 311 of the casino management system 102 are shown as being provided by separate servers for illustrative purposes. In other implementations, some functions may be provided by the same server (or the same group of servers where more than one server is needed to balance server load). FIG. 3 illustrates that modern casino (or other venue) management systems need to be able to manage a wide range of functionality. It will be appreciated that the functionality that is provided will, to some extent, depend on the complexity of the venue being managed. FIG. 3 includes only examples of the devices that may be interconnected within a venue.

The venue architecture has a client layer 310, a server layer 311 and a gaming floor layer 320. The client layer 310 and the server layer 311 are connected in a local area network via Ethernet. Venue architecture 300 also includes connections to external networks, e.g. the Internet (not shown). Client layer 310 consist of a number of workstations 313 for accessing services provide by the server layer 311. Different levels of access are provided to different workstations 313. For example, some workstations 313 may only allow access to the player tracking system for employees to enroll new loyalty members or edit member details. In the example, the server layer 311 provides a TITO system server 108, a player tracking system server 110, a progressive system server 112, a graphics server 302, a reports web server 304 and a table game server 306. Other servers 315 are provided to carry out network functionality such as backing up data, providing redundancy.

Gaming floor layer 320 provides two separate networks 322,324 for connecting EGMs 104 to the server layer 311. In other implementations, there may be a single network. A first network is a multi-drop floor protocol network 322 that supports connections via serial ports of the EGMs. As shown in FIG. 3 each EGM 104E-104I within the multi-drop floor protocol network is connected via a front-end processor 381, 382 to the server layer. There may be one or more front-end processors 381 connected to subsets of the EGMs 104.

As shown in FIG. 3, player marketing modules 105A, 105B are provided at each EGM 104. The second network is an ethernet based network 324. Other EGMs 104J, player marketing modules 105C, and automated table games such as an automated roulette table 373 are be connected via this network. Again, one or more front-end processors 382 connect the EGMs to the server layer 311. In some implementations, network connections may be different for EGMs 104 and the player marketing modules 105 provided at the respective EGMs 104. For example, a given EGM 104 may be connected to the multi-drop floor protocol network 322 while the player marketing module 105 is connected to the Ethernet network 324.

Gaming floor layer 320 also includes a reward centre kiosk 341 and a CRT 342. Table clients 372 and touch screens 371 that are for use at gaming tables are also in the floor layer. The table clients communicate with table game server 306. A wide variety of other components are provided within the gaming floor layer 320 including network printers 351, card encoder/printers 352, ID scanners 353, cheque printers 355, card swipe/readers 356, coin weigh scales 354, general ledger software 359, point of sale terminals 360 and pin pad terminals 361. Third party components can be connected by a Digi-Port server 362 such as a ticket in a barrel machine 363, security cameras 364, pagers 365, and third-party jackpot controllers 366. A graphics server 302 drives one or more standalone displays 333 and/or may drive a top box display 242A of an EGM 104I.

In recent times, there has been a trend towards users of loyalty systems being able to present their loyalty cards using an electronic version of the loyalty card stored on their mobile terminal, for example, by scanning a virtual barcode at the time of making a transaction or by near field communication (NFC) of the loyalty card data to a point of sale terminal. Integrating mobile terminal-based loyalty cards provides additional challenges within a casino management system 102 because of strict regulatory requirements. Mobile terminal-based loyalty cards also provide additional opportunities for enhanced functionality.

Figure 4:
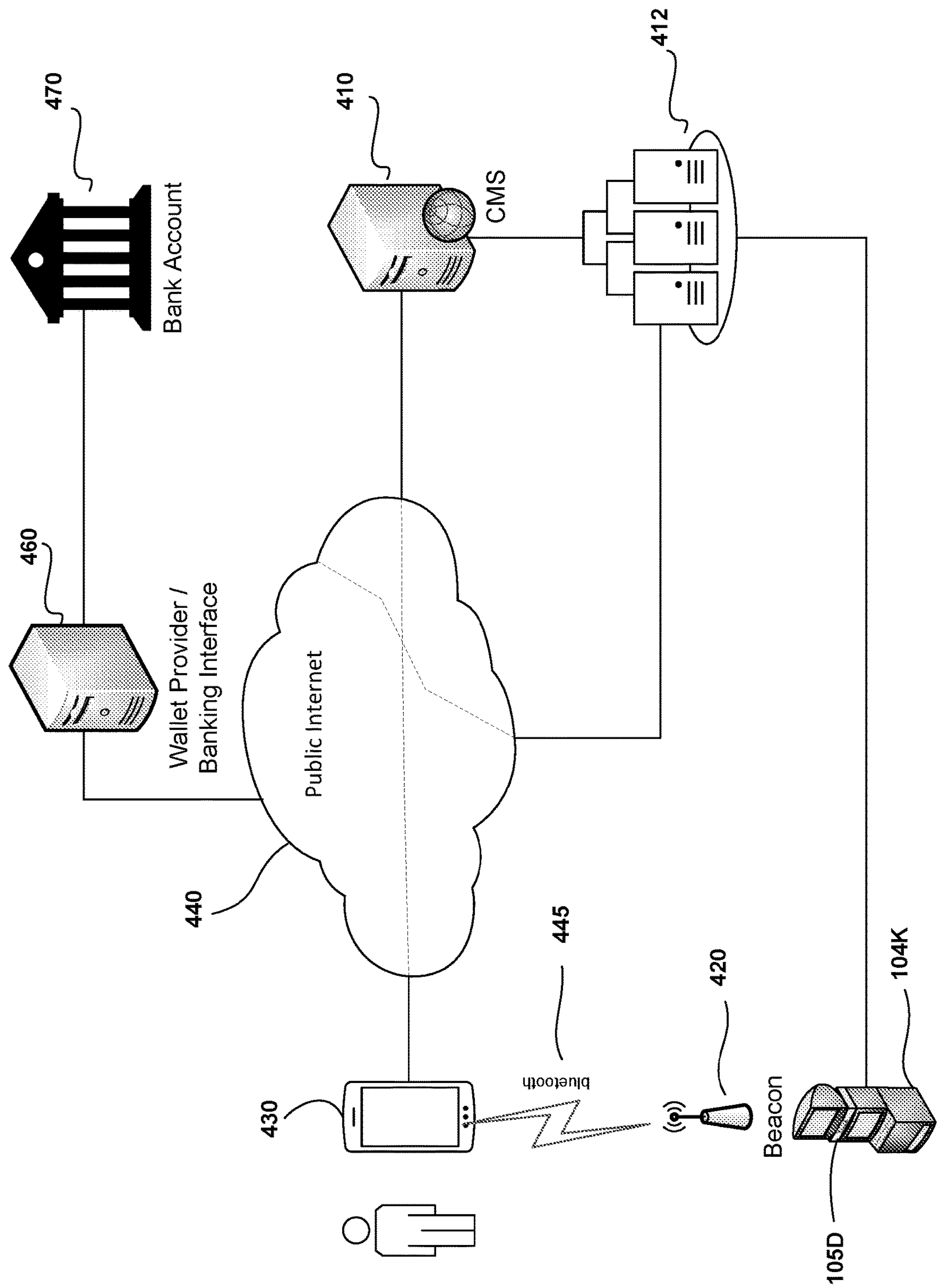
FIG. 4 is a block diagram of a funds transfer arrangement.

Referring to FIG. 4, there is shown a schematic diagram of an arrangement of an implementation for enabling a funds transfer method (for example, as set out in FIG. 5) for a gaming system. FIG. 4 illustrates a user mobile terminal 430 in the form of a Bluetooth® enable smartphone. Other mobile terminals 430 may be used, for example, tablets (such as an iPad) with cellular and Bluetooth® communication capability or smart watches with cellular and Bluetooth® communication capability. Further some venue configurations may permit the mobile terminal 430 to communicate via a Wi-Fi® or other wireless network in which case cellular communication capability is unnecessary.

In FIG. 4, a loyalty application has been downloaded to a mobile terminal 430. For purposes of this disclosure, the term "loyalty application" can also be generally referenced throughout as a "mobile application." A user interacts with the loyalty application to complete registration details, for example to establish an account and register his or her membership managed by the player tracking system 412. With reference to FIGS. 1 and 2, the player tracking system 412 can include one or more player tracking system servers 110 and can be part of or separate from the casino management system 102. The user can register by entering an existing player tracking identifier, scanning a player loyalty card, or establishing a new account within the player tracking system. The loyalty application also provides an interface to access to one or more local wallets managed by the player tracking system 412 and are not linked to external accounts.

In one or more implementations, the loyalty application includes a mobile wallet that provides options to enroll and/or register one or more external accounts (e.g., a main wallet) associated with one or more external mobile wallet providers 460 and/or other third-party payment providers. The mobile wallet can be an interface, engine, an application, and/or any other code-based functionality embedded within the loyalty application. The mobile wallet may make one or more application program interface (API) calls to the external mobile wallet provider 460 when enrolling and/or registering the external accounts. By enrolling and/or registering the external account, the mobile wallet can initiate a link between the external account (e.g., main wallet) to a gaming wallet, quarantine wallet, and/or any other local wallets the loyalty application is setup to access. After linking the external account to the local wallets, the mobile wallet can initiate the transfer of funds from the external accounts to one or more local wallets (e.g., gaming wallet) or vice versa. In one or more other implementations, the mobile wallet can operate as a separate mobile application from the loyalty application.

As shown in FIG. 4, the mobile terminal 430 connects to the player tracking system 412 via a content management system 410 configured to control the information presented via the mobile application to the mobile terminal 430. This arrangement permits the same mobile application to be used across a number of different gaming venues with the presentation of content specific to the venue being controlled by the content management system 410. The term "mobile application" can also be generally referenced throughout this disclosure as "application."

As shown in FIG. 4, a Bluetooth® beacon 420 is provided at each gaming device. Each Bluetooth® beacon 420 broadcasts 445 an identifier to nearby Bluetooth® enabled devices. In an implementation, the identifier of the Bluetooth® beacon 420 is a unique identifier that is stored in the memory of the player tracking system 412 in association with an identifier identifying the gaming machine with which the beacon is associated. Some beacons incorporate functionality that supports dynamically changing the broadcasted identifier (e.g., default identifier) to a unique identifier in which case the identifier is updated each time it is changed. While shown as a separate component is FIG. 4 for illustrative purposes, beacon 420 is provided within player marketing module 105D in the implementation and is under control of a processor of the player marketing module 105D. In other implementations, the beacon could be incorporated within the EGM 104K. Although FIG. 4 illustrates a Bluetooth® beacon 420 for communicating with the mobile terminal 430, other implementations could replace the Bluetooth® beacon 420 with other radio frequency devices (e.g., NFC transceiver) or incorporate additional radio frequency devices within the player marketing module.

With reference to FIG. 4, the loyalty application supports a user to connect over the Internet 440 to the external mobile wallet provider 460 to perform a wallet-top-up function. The wallet-top-up function corresponds to functionality that allows the mobile terminal 430 to transfer funds from a user bank account 470 to a user account managed and stored in the player tracking system 412 and between one or more wallets of the user account. As an example, when the mobile wallet loaded on the mobile terminal 430 initiates a fund transfer using one or more API calls, the external mobile wallet provider 460 transfers funds from the user bank account 470 to an external account (e.g., main wallet) and from the external account to a user account managed by the player tracking system 412. In one or more implementations, the user account includes one or more local wallets, such as a gaming wallet that the user can access at EGMs 104 and a quarantine wallet. In FIG. 4, the user account server that stores the user account can be integrated within the player tracking system 412. Other implementations may employ one or more separate and independent user account servers to maintain one or more wallets of the user accounts.

In implementations of the disclosure, when the loyalty application is running on the mobile terminal 430, the wallet top-up functionality is enabled only when the mobile terminal 430 is outside a defined zone, for example outside of a venue or inside a venue but outside of a gaming zone. An implementation enables the loyalty application to be used for other functionality within the venue such as transferring funds to gaming devices without breaching regulatory conditions or player preferences. For example, some jurisdictions prevent users from withdrawing funds from bank accounts within a gaming zone of a venue accordingly. Where the application is used to transfer funds to a gaming device in a gaming zone, functionality of the application for transferring funds to a gaming wallet is inhibited. In another example, a user may wish to prevent themselves from transferring funds when within a venue to preset a maximum amount that they can spend within a venue.

In an example, each user account on player tracking system 412 has a main wallet and a gaming wallet. In an example, the main wallet is used for non-gaming related transactions (e.g., all non-gaming related transactions). In an example, the main wallet is linked to an external account for transferring funds to and from a bank account. To transfer funds to the gaming wallet, funds must first be transferred to the main wallet. In another example, the main wallet may represent an external prepaid account that transfers funds to the gaming wallet. In other examples, funds may be transferred to the gaming wallet directly or the gaming wallet can be used for both gaming and non-gaming transactions. For example, in addition to transferring funds to a variety of games at a casino property, a gaming wallet can be setup to transfer funds for transactions relating to retail and/or restaurants that are part of, associated, and/or located on casino property.

The gaming wallet is used for gaming related transactions (e.g., all gaming related transactions). Specifically, the gaming wallet is the wallet that is used to transfer funds to and from a gaming device and/or other devices associated with a specific game type (e.g., player marketing modules incorporated into touch screens 371 for table games in FIG. 3). In one example, this functionality is enabled inside the gaming zone. In an example, the account server within player tracking system 412 also sets the maximum daily limits for transfers from the main wallet to the gaming wallet. To transfer funds from the gaming wallet to a gaming device or other device, the mobile terminal 430 may directly communicate with the player marketing module or directly to the account server within the player tracking system 412.

The player tracking system 412 may include a quarantine wallet and a loyalty wallet for each user account. The loyalty wallet stores vouchers earned and redeemed by a user's activity. The mobile terminal 430 can display active vouchers and redeemed vouchers within a certain period, for example, 12 months of history for redeemed vouchers. The quarantine wallet is used to hold funds earned from gaming related transactions for a defined period. When funds are held in the quarantine wallet, the mobile terminal 430 is unable to access the funds for gaming and/or non-gaming related transactions. For example, the mobile wallet loaded on the mobile terminal 430 may present the quarantine wallet has $10,000 in funds. The mobile wallet is unable to initiate a transfer of the funds to the gambling wallet and/or the main wallet until the defined period elapses.

Figure 6:
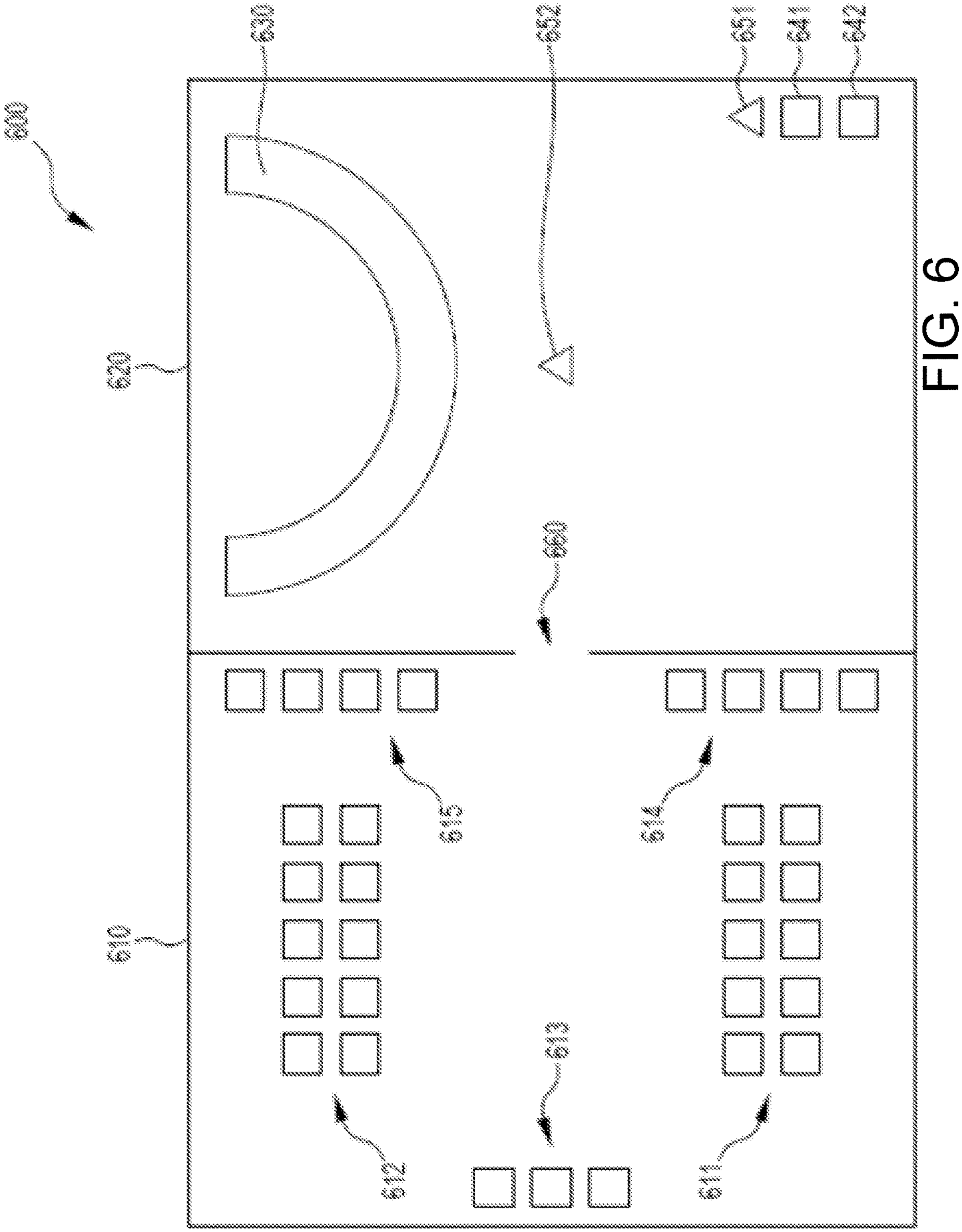
FIG. 6 is an example venue layout.

A schematic venue layout 600 is shown in FIG. 6. Venue layout 600 includes a gaming zone 610 comprising a plurality of banks of gaming devices 611-615. As indicated above, each gaming device has an associated beacon. Non-gaming zone 620 may include a bar 630 and automatic teller machines 641,642. As illustrated in FIG. 6, gaming zone 610 and non-gaming zone 620 may be connected by a doorway 660. In other examples, there may be no physical separation between gaming zone 610 and non-gaming zone 620.

Figure 5:
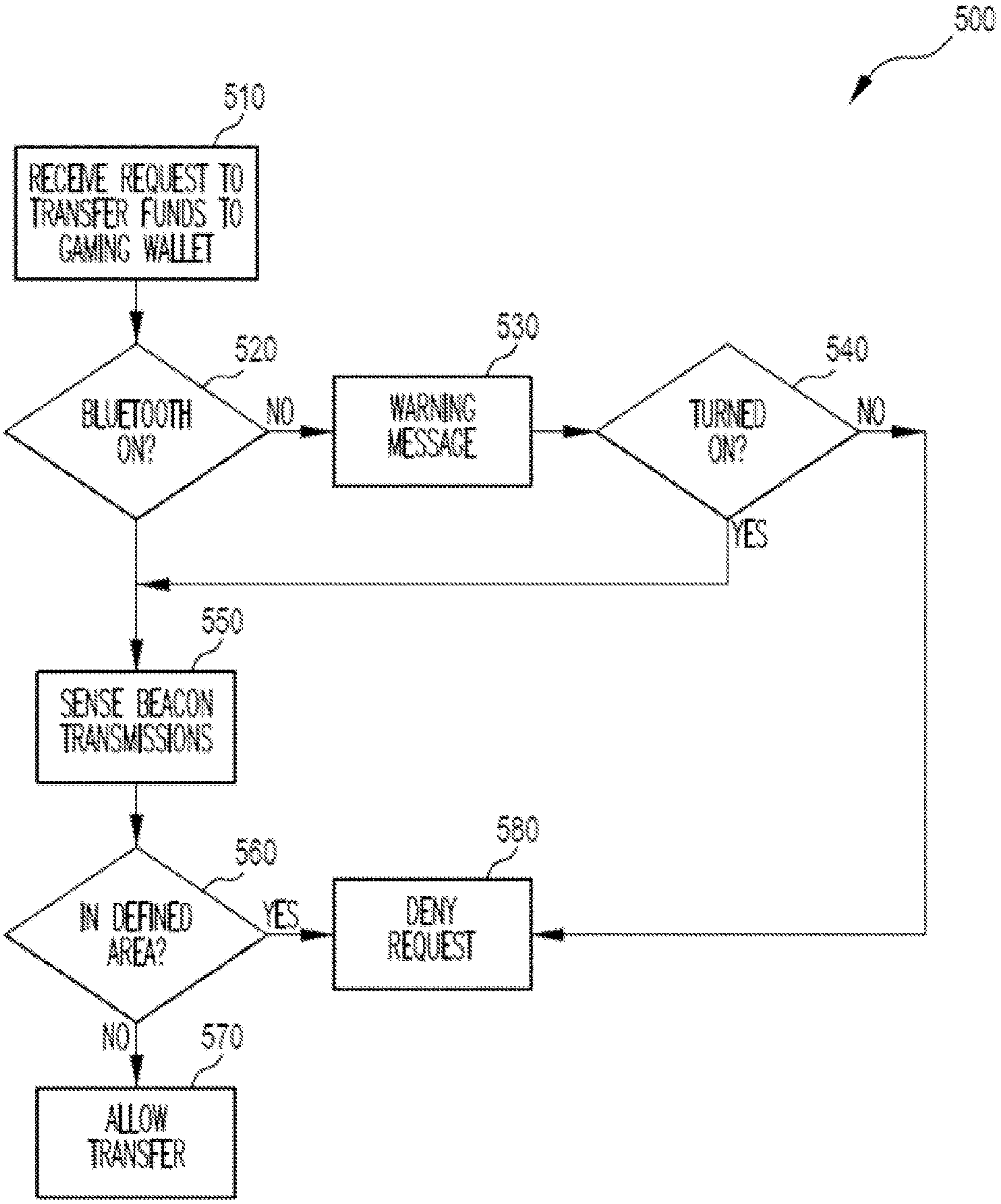
FIG. 5 is a flow chart of a fund transfer control operation.

FIG. 5 is a flow chart 500 of an operation for controlling funds transfer initiated by a mobile wallet. At step 510, the loyalty application executing on the user's mobile terminal receives a request to transfer funds to a gaming wallet from a main wallet. For example, the loyalty application may present a funds transfer screen to a user that the user can interact with to specify an amount to transfer. At step 520, the loyalty application causes the mobile terminal 430 to determine whether Bluetooth® is turned on. If it is turned off, the mobile terminal 430 displays 530 a warning message indicating that Bluetooth® must be on for the transaction to proceed and, for example, presenting a "retry" button that a user can press once they have turned on Bluetooth® (for example, by accessing the settings of their mobile terminal). At step 540, the mobile terminal 430 determines whether Bluetooth® has been turned on and if not denies 580 the request for funds transfer. If Bluetooth® has been turned on or was on in the first place, the operation proceeds to step 550 in which the mobile terminal 430 senses for beacon transmissions. In one example, the mobile terminal extracts an identifier from each Bluetooth® transmission that it receives.

At step 560, the mobile terminal 430 determines whether it is in a defined zone, for example, the gaming zone. In one example, the mobile terminal 430 does this by sending each identifier to player tracking system 412 which checks whether any of the identifiers corresponds to a gaming device within the gaming zone 610 and sends a response to the mobile terminal 430 to determine whether it is within the gaming zone 610. (In one example, this is a "yes"/"no" response.) If the mobile terminal 430 determines it is within the gaming zone it denies 580 the funds transfer request. Otherwise, at step 560 the mobile terminal allows the funds transfer request. In another example, the player tracking system 412 maintains a list of Bluetooth® identifiers corresponding to defined zones and looks them up directly without determining whether they correspond to an EGM. In other examples, funds transfers may be made when the mobile terminal 430 is able to sense an approved beacon, such a beacon 651 placed in proximity to automatic teller machines 641,642.

In other examples, a defined zone may extend beyond, for example, a gaming arca to prevent a funds transfer from occurring within a defined distance of the gaming area. In such an example, one or more beacons, such as beacon 652 may be placed within venue so that they will be sensed when the mobile terminal is within the defined distance. In an example, the beacon 652 is a standalone beacon. In another example, the beacon may be associated with a non-gaming device within the venue. For example, reward centre kiosk 341. In some examples, there may be more than one zone (e.g., plural gaming zones) where funds transfers to the gaming wallet are inhibited.

Accordingly, as described herein, a variety of specific technical improvements are achieved in specific manners by the present disclosure. For example, in at least some implementations, at least one specific technical improvement is to the field of electronic gaming, and more particularly, to the technical field of geofenced based electronic gaming. These technical improvements described herein allow users to use a mobile terminal and/or other features of the application to pay for a game located within a gaming zone without breaching regulatory requirements or player preferences. In particular, the implementations described herein allow for a player to be prevented from transferring funds to a gaming wallet when they are in a gaming zone (e.g., a gaming floor of a casino). For example, some jurisdictions prevent users from withdrawing funds from bank accounts within a gaming zone of a venue. Moreover, some users may prefer to be prevented from transferring funds into a gaming wallet when they are located within a gaming zone. As a result, at least some implementations of the disclosure allow players to use the mobile terminal to transfer funds from a gaming wallet to a gaming device in a gaming zone, while preventing the players from violating jurisdictional requirements and/or player preferences by transferring funds from another account and/or wallet to the gaming wallet when they are within the gaming zone.

These improvements are accomplished, as described in detail herein, with at least one transmitter (e.g., a Bluetooth® beacon) located in proximity to gaming device. For example, prior to initiation of funds transfer between different accounts (e.g., between a main wallet and a gaming wallet), an application on a mobile terminal may first be required to determine whether the mobile terminal is receiving a transmission from any transmitter within the gaming zone. If the mobile terminal determines that the mobile terminal is receiving a transmission from at least one transmitter within the gaming zone, the transfer of the funds may be prevented. Alternatively, if the mobile terminal determines that the mobile terminal is not receiving a transmission from at least one transmitter within the gaming zone, the transfer of funds may be allowed to proceed. This may ensure that a player's mobile device is not within a gaming zone prior to initiation of the funds transfer.

Figure 7A:
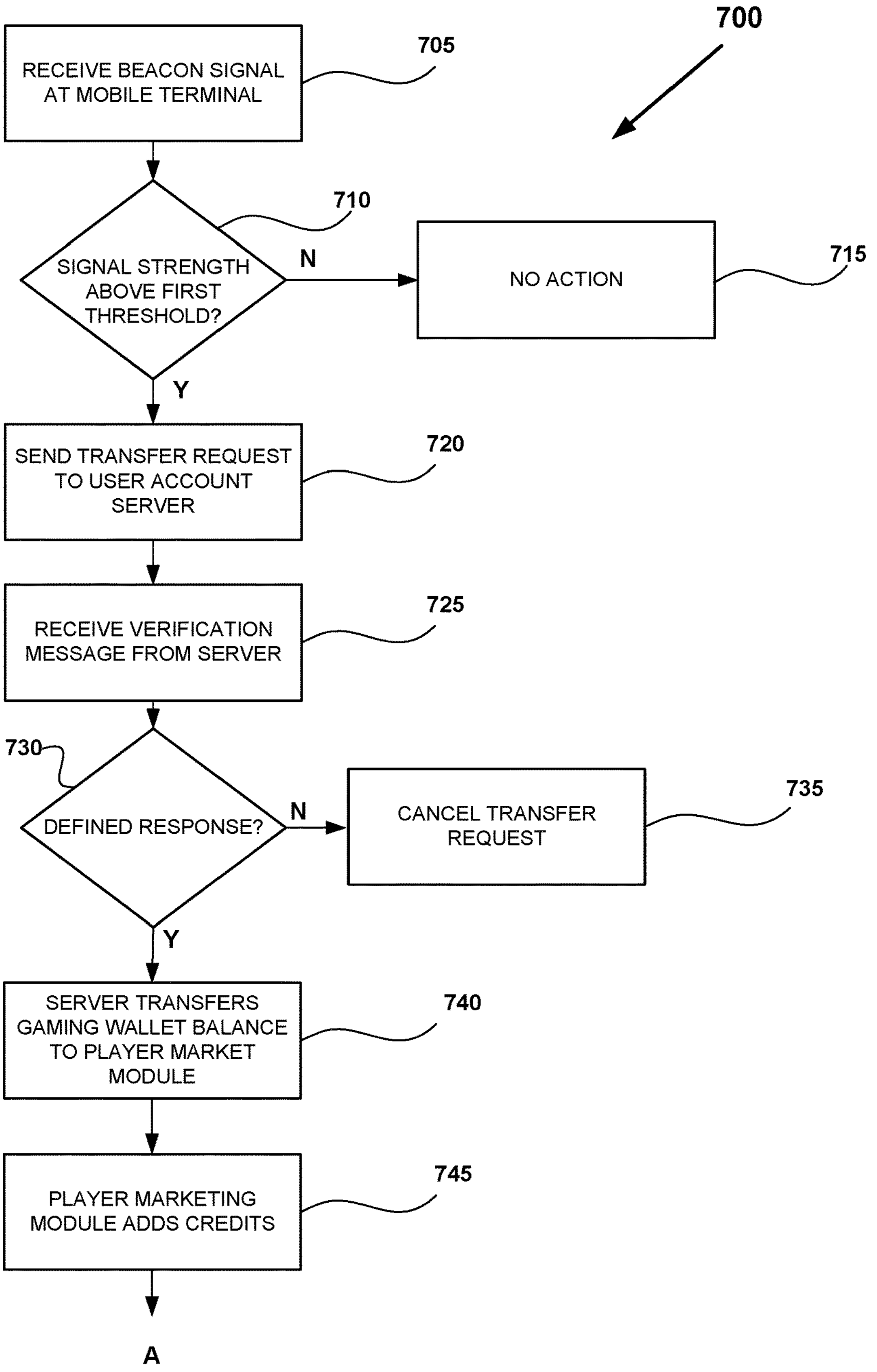
FIGS. 7A and 7B show a flow chart of a fund transfer operation.
Figure 7B:
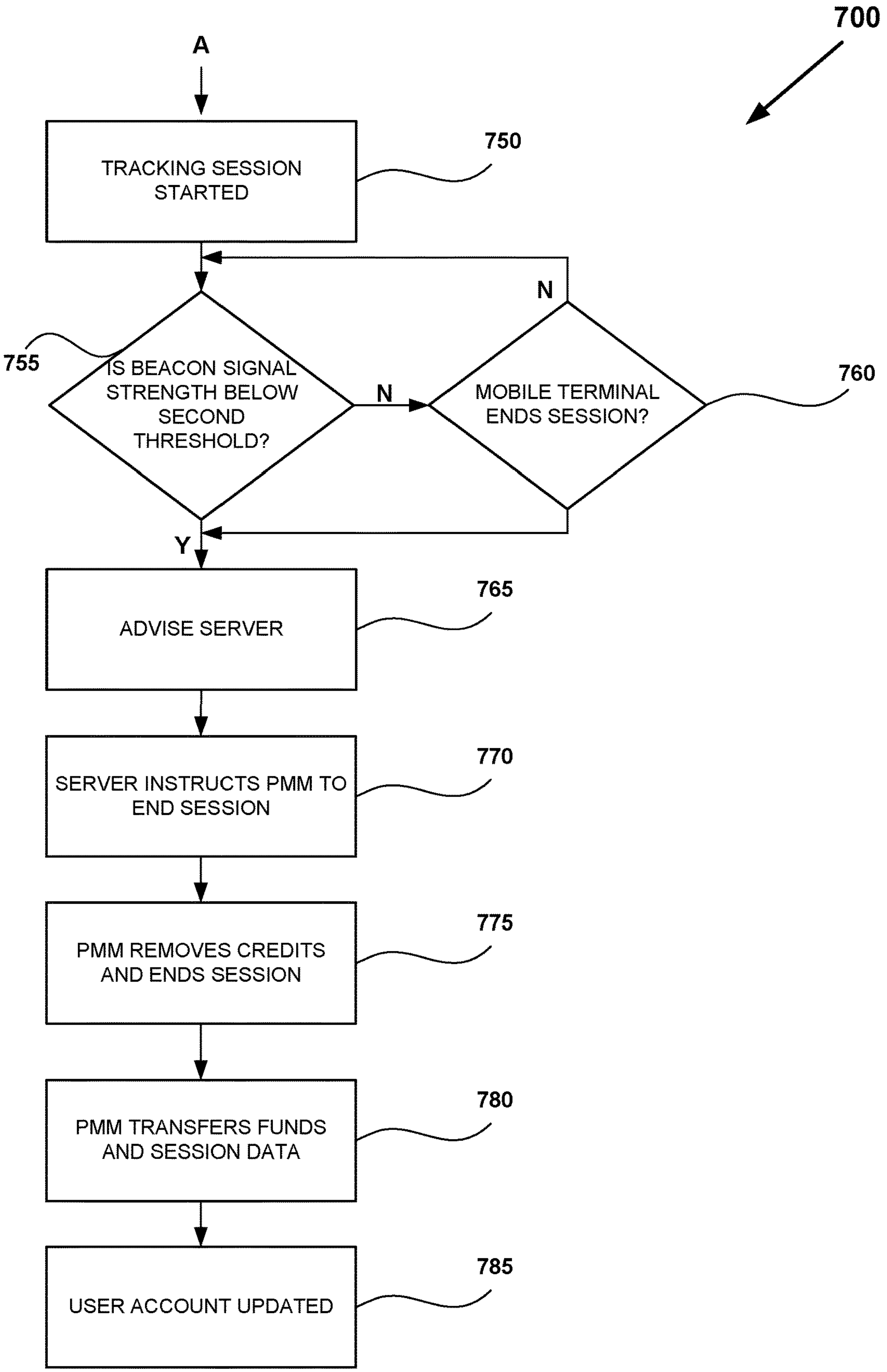

FIGS. 7A and 7B show another funds transfer operation 700 that is based on proximity to a gaming device. In the implementation, the user opens the loyalty application on their mobile terminal 430 when approaching an EGM or other gaming device. In FIG. 7A, at step 705, the mobile terminal 430 receives a beacon signal. At step 710, the mobile terminal 430 measures the signal strength of the beacon and determines whether the signal strength is above a first threshold. In this example, the signal strength being above the first threshold is a first (or initial) proximity criterion for determining that the mobile terminal is within a close enough proximity of the EGM. In some implementations, the mobile application includes a "connect" virtual button which the user needs to touch before the mobile terminal measures the signal strength so that the user can ensure that the mobile terminal is close to their desired EGM before the mobile application attempts to acquire the beacon signal. In an example, an additional proximity criterion is that the signal strength of the beacon is the strongest beacon signal that the mobile terminal has received in a defined time period, for example, the last 3 seconds. In one example, the first proximity criterion is set so that the mobile terminal is placed relatively close to the EGM, e.g. 10-20 CM for the first proximity criterion to be satisfied.

If the signal strength is not above the threshold, the mobile terminal either takes no action or outputs an error message at step 715. At step 720, the mobile terminal 430 sends a funds transfer request to the user account server (in this example, an account server within a player tracking system 412) over the public internet 440. The funds transfer request includes a beacon identifier extracted from the beacon signal. In another example, the mobile terminal 430 sends the funds transfer request over a local Wi-Fi® network to the server 110.

In response to receiving the funds transfer request, the account server within the player tracking system 412 extracts the beacon identifier and uses the beacon identifier to identify the EGM associated with the beacon. The account server within the player tracking system 412 uses the identity of the EGM to generate a verification message containing information identifying the EGM and sends it to the mobile terminal. In an example, the information is an image of the game available for play at the EGM. In other examples, the information is alternatively or additionally the name of the game or an identifier shown at the EGM, for example, displayed on the display of the player marketing module 105D.

At step 730, the mobile terminal 430 waits for the user to enter a defined response to the verification message, e.g. to touch a button confirming that they have received a verification message for the correct machine. If a defined response is not received, at step 735 the transfer request is cancelled. Assuming the user enters the defined response at step 730, at step 740, the account server transfers a balance of a gaming wallet to the player marketing module 105D. At step 745, the player marketing module 105D adds the equivalent value in credits to the credit meter of the EGM. In other examples, the user selects an amount to transfer as part of generating a transfer request. In other examples, the user may be able to pre-configure an amount to be transferred (e.g. a desired amount to spend).

In FIG. 7B, the player marketing module 105D starts a tracked gaming session at step 750. In an alternative implementation, the verification is performed by the player marketing module 105D displaying a code, which can be randomly generated and sent to the account server within the player tracking system 412. In an example, this code (e.g. a barcode, QR code, or numeric code) is read by the mobile application and/or entered by the member into the mobile application and sent to the account server within the player tracking system 412. When the transmitted code matches the player marketing module's 105D code, the member's physical presence at that EGM is confirmed.

At step 755, the mobile terminal 430 begins a process of monitoring the beacon signal strength associated with the EGM to determine whether a second, ongoing proximity criterion is met. In the implementation, the second proximity criterion is a second threshold, lower than the first threshold. That is the second proximity criterion corresponds to the mobile terminal being further from the EGM 104K than to satisfy the first proximity criterion. In this way the user can use their phone in a normal fashion, for example, to take calls, send messages, or take photos. However, should the user walk away from the EGM 104K without ending a gaming session, the mobile terminal 430 will determine that the signal strength has fallen below the second threshold and take action to end the gaming session. Thus, if for example, the user takes a call and walks away from the EGM 104K the session can be ended automatically by the mobile terminal 430. In another example, the user may simply forget to end the gaming session manually and walk away with their mobile terminal 430 which can end the session automatically.

In an example, the second, ongoing proximity criterion is configured based on an estimate of a distance the user will be from the player marketing module 105D when using the mobile terminal 430 in a conventional manner. In some examples, a tolerance is built in to avoid accidental disconnection. In an example, the second threshold is configured so that the mobile terminal 430 ends the gaming session upon the mobile terminal 430 being more than 1 m from the player marketing module 105D. In other examples, the second threshold is configured so that the mobile terminal 430 ends the gaming session upon the mobile terminal 430 being more than 1.5 m, or more than 2 m, or more than 3 m or more than 5 m from the player marketing module 105D. In an example, the second proximity criterion is indicative that the user of the mobile terminal 430 is located at the gaming device when using the mobile terminal to carry out a mobile terminal action such as taking a call, sending a message, or taking a photo.

In another implementation, the player marketing module 105D may increase the power of the beacon transmission after the gaming session is established. In this example, the second threshold could be the same or higher than the first threshold yet be indicative that the mobile terminal 430 is further from the EGM. In this respect, at step 765, the mobile terminal 430 communicates to the account server within the player tracking system 412 that it has lost contact with the beacon and the account server instructs the player marketing module 105D to end the gaming session at step 770.

At step 775, the player marketing module 105D ends the gaming session and removes credits from the EGM 104K. Removing the credits from the EGM prevents another person from playing at the EGM with the user's credit. At step 780, the player marketing module 105D transfers the funds to the account server within the player tracking system 412, which adds the funds to the gaming wallet of the user. The player marketing module 105D also communicates data about the gaming session so that the server can update the player's loyalty membership records.

At step 785, the account server within the player tracking system 412 updates the gaming wallet and the user's loyalty membership records. Referring again to step 755, while the mobile terminal determines that the second proximity criterion is met, the user may at any time end the gaming session manually at step 760, for example by selecting an "end session" button via the user interface of the mobile application running on mobile terminal 430.

In an example, when the mobile terminal 430 is more than a defined distance (e.g. 1 m) from the beacon, the mobile application will warn the user and instruct the user to either terminate the game session or move back to the EGM. If the mobile terminal remains outside the defined distance for a certain duration (configurable), the mobile application automatically instructs the player tracking system server 110 to terminate the game session and move any money on the EGM 104 to the player's account.

In some examples, the mobile terminal 430 continuously polls the account server within the player tracking system 412 allowing both the mobile terminal 430 and the server to verify that communication is still active. Should the communication fail (as described above), the account server will automatically terminate the game session. In some examples, the mobile terminal may be configured to wait a defined period or conduct a defined number or reconnection attempts prior to determining that communication has failed.

In some implementations, there may not be an initial funds transfer when the gaming session when a gaming session is initiated. In an example, steps 740 and 745 are replaced by a step of the server advising the player marketing module 105D to start a tracking session (which is implicit in the funds transfer of step 740) and a step of the user adding credit to the gaming machine using another credit mechanism at the EGM 104K such as a bill validator 234.

In another example, there may not be a funds transfer at the end of a gaming session ended in response to determining that the user mobile terminal 430 no longer satisfies a proximity condition, for example, all of the funds on the EGM may have been exhausted or the player marketing module 105D may just monitor the gaming session for player tracking purposes and the user may need to cash out via other means such as via a ticket printer 222. Such an example has the advantage of more accurately documenting the user's gaming session at the player tracking system server 110.

In some implementations, there may be additional functionality or monitoring the gaming session, for example, the player tracking system server 110 may poll the mobile terminal 430 periodically to check that the mobile terminal 430 is still monitoring the beacon 420. Another implementation may include an implementation where the mobile terminal periodically polls the system so both the mobile terminal and system can determine that communication is still active. The game session and transfer of any money from the gaming machine to the player's account may occur when the system determines the mobile is no longer communicating.

In an alternative implementation, a different process is used to start the gaming session and the beacon 420 is used by the mobile terminal 430 to monitor whether to end the gaming session. For example, an NFC transceiver could be incorporated within the player marketing module 105D and the user could bring their mobile terminal into close enough proximity (satisfying a proximity criterion) to the NFC transceiver to start a gaming session. In this example, the mobile terminal 430 may communicate a user identifier to the player marketing module 105D to initiate a funds transfer request from the player tracking system 412 such that the initial funds transfer request does not require the mobile terminal 430 to communicate with the player tracking system 412.

Accordingly, as described herein, a variety of specific technical improvements are achieved in specific manners by the present disclosure. For example, in at least some implementations, at least one specific technical improvement is to the field of electronic gaming, and more particularly, to the technical field of proximity based electronic gaming. These improvements are accomplished, as described in detail herein, by the use of a first threshold signal strength (corresponding to a first threshold distance between a player's mobile terminal/device and an EGM) as a prerequisite to establishing a gaming session and/or initiating a wagering game. This may ensure that a player's mobile device is sufficiently near the EGM (e.g., less than one meter) prior to initiation of the wagering game. Likewise, once the wagering game is securely established, the signal strength requirement may be reduced (e.g., by several meters), such that the player has some freedom to roam in proximity to the EGM.

These improvements therefore include the addition of a security requirement (e.g., that the player is sufficiently close to the EGM) prior to establishing a gaming session. Once the gaming session is established, the security requirement may be relaxed, whereby the player has some ability to move around the EGM (e.g., to stand up from the EGM), such as, for example, to take a phone call on his or her mobile device, to send an email or text message using the mobile device, to take a photograph using the mobile device, to stretch or take a short break from the gaming session, and the like. Another specific technical improvement is to the electronic gaming system itself. Specifically, as described herein, the system of the present disclosure reduces or eliminates reliance on a physical loyalty club card for player identification and retrieval of credit balance information. Rather, the systems and methods of the present disclosure facilitate a secure, wireless, and card-less (e.g., loyalty card-less) mechanism for identifying a player, providing a wagering game to the player on an EGM within a casino based upon the player's proximity to the EGM, retrieving the player's credit balance from a backend system, such as player tracking system 412, providing the wagering game, and uploading or transferring the player's new or adjusted credit balance back to the player tracking system 412 on termination of the gaming session.

Figure 9:
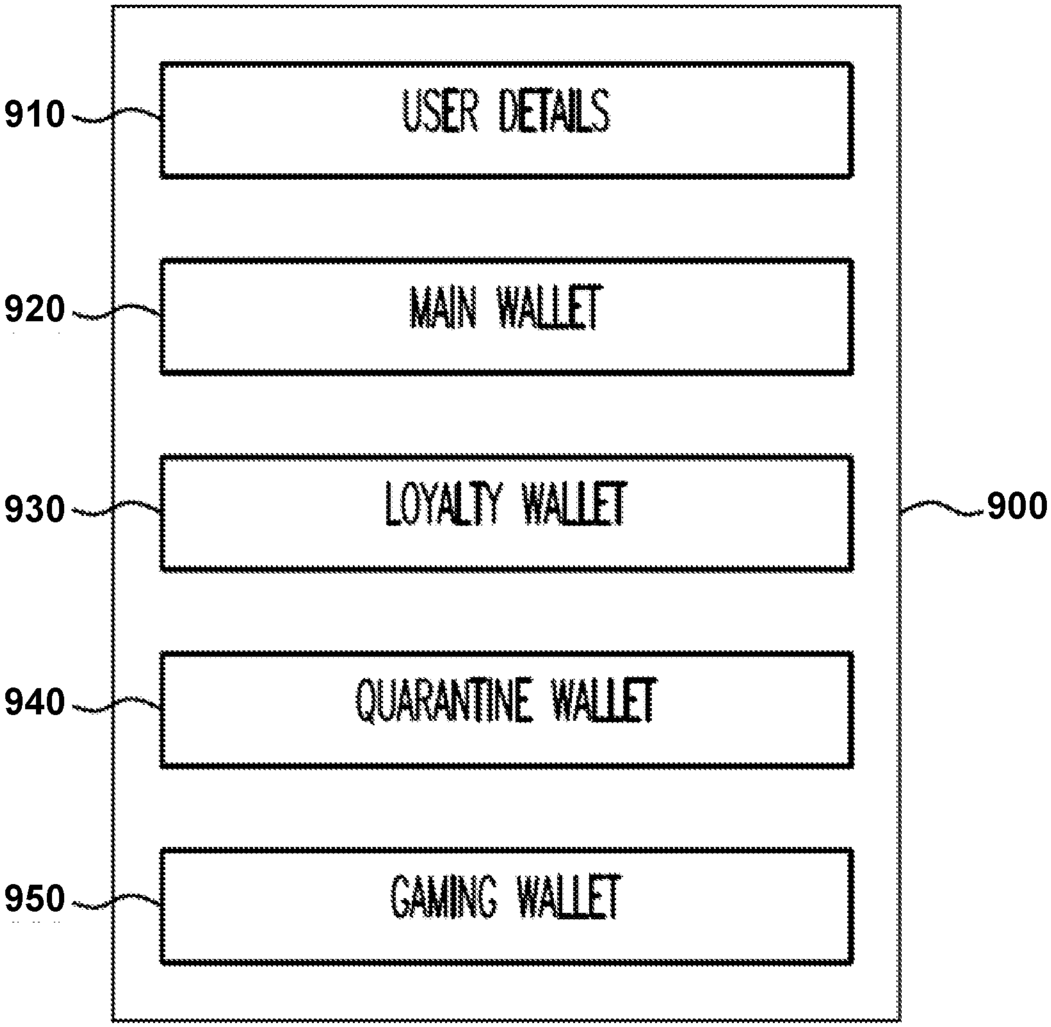
FIG. 9 shows an example user account structure.

FIG. 9 illustrates an implementation where each user account 900 on an account server has user details 910 (name, address, phone number, etc.) and a number of wallets. The account server can be part of a player tracking system or be separate from the player tracking system. The wallets linked and associated with the user account 900 include a main wallet 920 and multiple local wallets, such as gaming wallet

950, and quarantine wallet 940, and loyalty wallet 930. In an example, the main wallet 920 is used for non-gaming related transactions and corresponds to an external account provided by an external mobile wallet provider. The main wallet 920 is the account that is used to transfer funds to and from a bank account. Accordingly, to transfer funds from a bank account to the gaming wallet 950 or vice versa, funds are first transferred to the main wallet 920 and subsequently to one or more local wallets from the main wallet 920. Although FIG. 9 illustrates that the user account 900 has been setup to include a main wallet 920, other implementations may not include the main wallet 920. Instead, user account 900 would link one of the local wallets (e.g., gaming wallet 950) to main wallet 920, which is managed by an external mobile wallet provider. Additionally, or alternatively, user account 900 could link gaming wallet 950 to other external accounts (e.g., a prepaid account) managed by other third-party payment providers.

The gaming wallet 950 is used for gaming related transactions (e.g., all gaming related transactions). In one or more implementations, the gaming wallet 950 could also be used for non-gaming related transactions. The gaming wallet 950 can be managed and provided by the operator or another party that differs from the external mobile wallet provider. As an example, the main wallet 920 could be managed and provided by third-party payment providers and the gaming wallet 950 is managed and provided by a casino. The gaming wallet 950 represents a wallet that is operable to transfer funds to a gaming device and/or other device associated with a game. In an example, an account server within player tracking system 412 can set the maximum daily limits for transfers from the main wallet 920 to the gaming wallet 950. The loyalty wallet 930 stores vouchers earned and redeemed by a user's activity. The loyalty wallet 930 is accessible to display active vouchers and 12 months of history of redeemed vouchers.

As explained further below, the quarantine wallet 940 is used to hold funds for a defined period in a way that prevents them from being accessed by a mobile terminal for gaming and/or non-gaming related transactions. Recall that a mobile wallet loaded on a mobile terminal can initiate fund transfers between wallets. However, the mobile wallet is unable to initiate fund transfers from the quarantine wallet to other local or external wallets until after the defined period expires. In one example, the mobile wallet can access and initiate transfer of quarantined funds for non-gaming related transactions before the defined period expires. In another example, quarantined funds cannot be accessed at all during the defined period. FIG. 9 illustrates that the quarantine wallet 940 is a separate wallet, but other implementations could have the quarantine wallet 940 be part of the gaming wallet 950. In one or more implementations, similar to the gaming wallet 950, the quarantine wallet 940 is managed by the operator or another party that differs from the external mobile wallet provider for the main wallet 920. Accordingly, to transfer funds from the quarantine wallet 940 to a bank account, funds are first transferred to the main wallet 920.

In some jurisdictions, wins above a certain amount or falling into a specific category are typically paid by cheque. In some examples, this is to ensure that the user cannot access the funds until after the funds have been deposited and the cheque has been cleared. The cheque clearance in effect ensures there is a delay before the user can spend the funds on gaming related activities. In one example, when a user cashes out from a gaming machine, the user is issued a ticket having a value. The user presents the ticket at a cashier and if it is above a defined value (e.g. $1,000), the user cannot be issued the full amount as cash. In some examples, the user is issued a cheque for the full amount. In other examples, the user may receive a portion of the amount (e.g. $1,000) and the rest in cash. Another example of an existing practice is when a user wins a large jackpot prize. In such an example, the gaming machine is locked, and the user is required to call an attendant. When the attendant arrives, the attendant issues a cheque for the full jackpot amount. It will be appreciated that these existing practices are inconvenient for both the user and the venue. For example, for payment of jackpot prizes, the venue must have staff on hand who have had training to handle this situation. Similarly, it is inconvenient for a user to have to visit their bank to deposit the cheque.

The implementations provide a technical solution to this problem incorporating a quarantine wallet 940 into the user account where funds can be stored for a defined period before they are released. As well as, or alternatively to, addressing this problem, certain implementations authorize a user to set their own criterion for funds transfer to the quarantine wallet 940. An advantage of a user setting his or her own criterion is that the user can set criterion for funds transfer in advance. An operator interface is provided (e.g. via workstations 313) to access an operator account that includes options to configure system level criterion for automatic transfer to the quarantine wallet 940. For example, when the operator signs into an operator account, the operator interface generates a prompt to set an amount and a time for which the funds will be quarantined. In other implementations, the operator, with the operator account, is given additional control over other criteria for defining when funds are transferred to the quarantine wallet 940, for example, the operator, using the operator account, is able to set a number of different amounts which are associated with another factor, for example, size of win, type of EGM, EGM identity, area of a venue, type of win etc.

A user interface is provided via the mobile wallet and/or loyalty application on the mobile terminal. A user accessing the user interface is prompted to set an amount and a time for which the funds will be quarantined. As with the operator interface, the user interface may provide additional control, for example, by enabling the user to set the amount transferred as a defined amount of any win over a defined funds amount, enabling the user to set different amounts for different win amounts, or even allowing the user to set different amounts for different time periods or days of the week, or set different quarantine periods for different amounts, etc. The user interface may be beneficial or relevant in promoting responsible gaming initiatives.

In examples where the operator, using an operator account, or user, using a user account, can specify multiple criteria, the system can be configured either so that the operator/user cannot specify conflicting criteria, or so that if any criterion is satisfied funds are transferred or so that multiple criteria must be met. In some implementations, the operator and/or user interfaces provide a user to specify how much or a percentage of a win amount that will be transferred. In some examples, the operator and/or user interfaces may specify that funds over a defined amount are transferred.

To access the different wallets stored on the user account 900, a mobile wallet loaded on a mobile terminal 430 may facilitate communication between the mobile terminal 430 and the different wallets stored on the account server. Through the mobile wallet, the mobile terminal 430 integrates the main wallet 920 supported by an external mobile wallet provider and/or financial account with a gaming wallet. Specifically, the mobile wallet links the main wallet 920 to a gaming wallet 950 after a user successfully registers with the external mobile wallet provider. By linking the main wallet 920 with the gaming wallet 950, the mobile wallet loaded on the mobile terminal 430 can define funds held in the main wallet 920 to transfer down to the gaming wallet 950 and vice versa. The mobile wallet can also interact with a quarantine wallet 940, which can be part of the gaming wallet 950 or separate from the gaming wallet 950.

Figure 8:
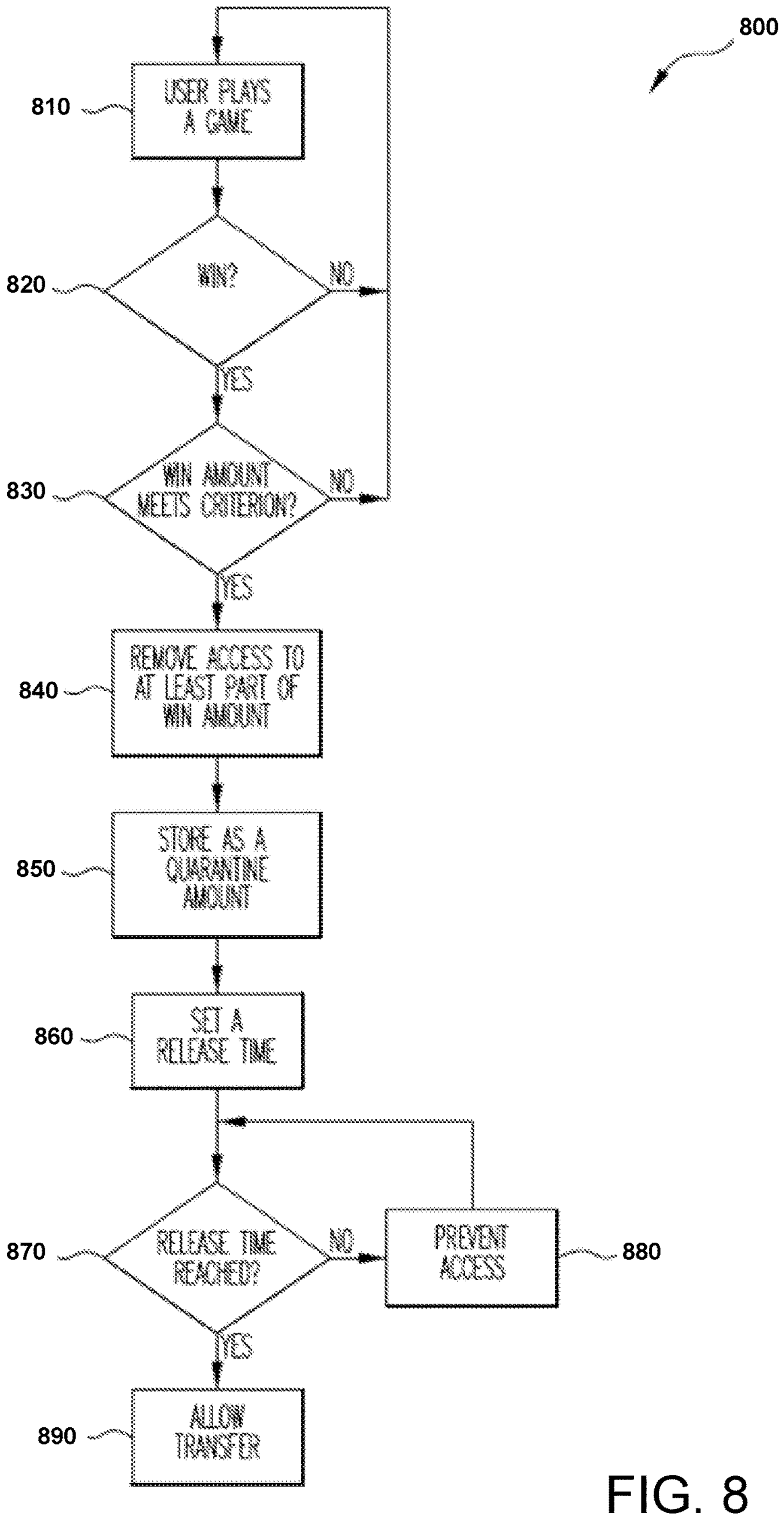
FIG. 8 is a flow chart of a funds control operation.

FIG. 8 is a flow chart of another funds transfer operation 800 related to a quarantine wallet. At step 810, a user starts a gaming session, for example, by presenting their electronic loyalty card to a player marketing module 105 at one of the EGMs 104 and transferring funds from the gaming wallet 950 of their user account to the EGM 104. As previously discussed with respect to FIGS. 5, 7A, and 7B, operation 800 may transfer funds from the gaming wallet 950 to the EGM 104 based on EGM proximity and whether the mobile device is in the appropriate geofenced zone.

The user then plays a game via the EGM in a conventional manner. The gaming system monitors play of the game. The monitoring can be performed in a number of different ways, for example, by the EGM 104 or the player marketing module 105 or for jackpot wins, at a jackpot controller 366.

In an example, where monitoring is performed at the player marketing module 105, this is achieved by a routine that monitors whether there is a win at step 820 and if here is a win, determining at step 830 whether the win amount meets the defined criterion (e.g. a defined amount). For example, when the user connects to the player marketing module 105, the player marketing module 105 accesses any user defined criterion stored against the user account (for example, in user details 910) and stores a copy locally.

In the example, at step 840, the player marketing module 105 removes access to at least part of the win amount by transferring it to the account server which stores 850 the at least part of the win amount as a quarantined amount in a quarantine wallet of the user account associated with the user. In an implementation, if the player marketing module 105 is unable to transfer the at least part of the win amount to the account server in the player tracking system 412 (for example, due to the account server being temporarily unavailable), the player marketing module 105 causes the gaming machine to lock and prompts the user to call an attendant.

At step 860, the account server within the player tracking system 412 sets a release time for the quarantined amount upon receipt based on the user and/or operator configured time. In an example, the release time is set by the account server calculating a release time upon receipt. In another example, a release time is set by the account server recording a received time and checking whether the configured time has expired if an attempt is made to move the quarantined funds amount. In another example, the account server in the player tracking system 412 sets a timer in respect of each quarantined amount.

At step 870, the account server within the player tracking system 412 determines whether the release time has been reached. For example, where a user uses their mobile device to view the account, the account server within the player tracking system 412 determines whether to show the quarantined amount as greyed out so that the user cannot select it thereby preventing accessing the funds at step 880. In other words, the mobile wallet loaded on the mobile terminal is unable to initiate a fund transfer from the quarantine wallet to another wallet, such as the gaming wallet 950 or main wallet 920. In one example, once the release time is reached, the account server and/or mobile wallet can initiate a transfer of the quarantined funds to their main wallet 920 and from there to their bank account or the gaming wallet 950.

In another example, the account server within the player tracking system 412 conducts a check at step 870 responsive to a request from the user to transfer funds to the gaming wallet. In some examples, the user may be able to access the funds for non-gaming purchases such as food, beverages, or accommodation. In such examples, the account server within the player tracking system 412 checks whether the transaction relates to a gaming or non-gaming transaction and only checks the release time for attempted gaming transactions.

At step 890, operation 800 allows for a fund transfer after the funds satisfies the release time. In some examples, the account server within the player tracking system 412 automatically authorizes and transfers the funds to the main wallet 920 and/or gaming wallet 950 after the release time. For example, when a timer expires the account server within the player tracking system 412 automatically authorizes and transfers quarantined funds to a main wallet 920 and/or gaming wallet 950. In another example, the account server periodically checks for quarantine amounts with release times that have been reached and authorizes and transfers quarantined amounts to the main wallet 920 and/or gaming wallet 950. In another example, the loyalty application may generate and present a notification at the time the funds become available to transfer. Afterwards, the mobile wallet may initiate a fund transfer of the quarantined amounts to the main wallet 920 and/or gaming wallet 950. In implementations where the quarantined funds are first transferred to the main wallet 920 and subsequently to the gaming wallet 950, the transfers between the main wallet 920 and gaming wallet 950 may be denied depending whether the mobile terminal is located within a defined zone as depicted in FIG. 4.

Figure 10:
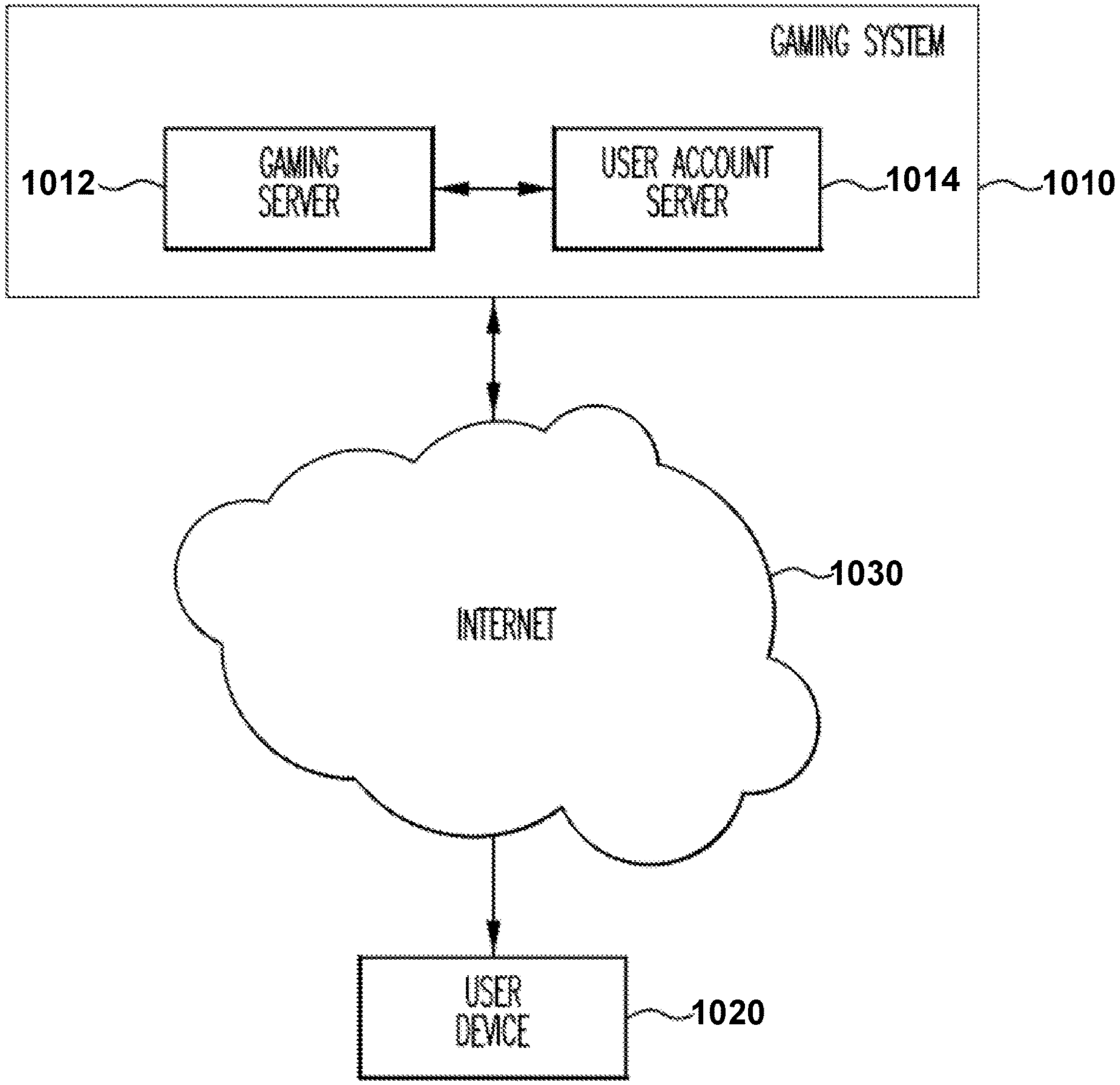
FIG. 10 is a block diagram of an alternative gaming system.

FIG. 10 illustrates an alternative gaming system 1010 for online gaming. As showing in FIG. 10, a gaming server 1012 establishes gaming sessions for user devices 1020 that connect to the gaming system 1010 over the Internet 1030. User devices can be any suitable web-enabled device or have a gaming application that establishes a connection to the gaming system. Gaming system 1010 has a user account server 1014 that stores user accounts for users such as illustrated in FIG. 9 and described above. When the user operates user device 1020 to connect to gaming system 1010, the user device 1020 can access the user account server and transfer funds to the started game session. Gaming server 1012 is configured to monitor the user's play of the game and determine whether a win amount satisfies one or more defined criteria in the manner described above and stores at least part of any amount satisfying the criteria in a quarantine wallet in the user account for a defined time period.

In other implementations, account server 1014 and gaming server 1012 are provided by a single server. Alternatively, as is known in the art, the functions of a single server may be carried out by multiple servers for load balancing to deliver the desired quality of service. In some examples, there may not be an initial funds transfer from a gaming wallet when a gaming session is initiated. In an example, a user adds credit to the gaming machine using another credit mechanism at the EGM 104K such as a bill validator 234.

While the invention has been described with respect to the accompanying figures, it will be appreciated that many modifications and changes may be made by those skilled in the art without departing from the spirit of the invention. Any variation and derivation from the above description and figures are included in the scope of the present invention as defined by the claims.

The present disclosure is widely applicable to numerous implementations, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular implementations and/or drawings, it should be understood that such features are not limited to usage in the one or more particular implementations or drawings with reference to which they are described, unless expressly specified otherwise.

The present disclosure is neither a literal description of all implementations nor a listing of features of the innovations described herein that must be present in all implementations.

The Title (set forth at the beginning of the first page of this disclosure) is not to be taken as limiting in any way as the scope of the disclosed implementations. Headings of sections provided in this disclosure are for convenience only and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget"" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or implementations thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other implementations need not include the described device itself, but rather can include the one or more other devices which would, in those other implementations, have such functionality/features.

Further, the systems and methods described herein are not limited to the specific implementations described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an implementation with several components or features does not imply that all or even any of such components and/or features are required. On the contrary, a variety of optional components are described to illustrate the wide variety of possible implementations of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other implementations within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other implementations within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some implementations, hard-wired circuitry or custom hardware may be used in place of, or in combination with, software instructions for implementation of the processes of various implementations. Thus, implementations are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, programmable read-only memory (PROM), erasable programmable read-only memory (EPROM), and other persistent memory) and volatile memory (such as dynamic random access memory (DRAM)). The term "computer-readable media" excludes signals, waves, and wave forms or other intangible or transitory media that may nevertheless be readable by a computer.

The present disclosure provides, to one of ordinary skill in the art, an enabling description of several implementations and/or innovations. Some of these implementations and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary implementations of the present disclosure. Modifications of the above disclosed apparatus and methods which fall within the scope of the present disclosure will be readily apparent to those of ordinary skill in the art. For example, although the examples discussed above are illustrated for a gaming market, implementations of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible implementations to which the principles of the disclosed invention may be applied, it should be recognized that the illustrated implementations are only preferred examples of the invention and should not be taken as limiting the scope of the invention. Rather, the scope of the invention is defined by the following claims. We therefore claim as our invention all that comes within the scope and spirit of these claims.

What is claimed is:

1. A system comprising:
a mobile terminal including:
one or more displays,
one or more processors, and
one or more memory devices, the one or more memory devices storing computer-executable instructions which, when executed by the one or more processors, cause the one or more processors to:
determine whether or not the mobile terminal is within a predefined area based on detection or non-detection, by the mobile terminal, of one or more radio frequency beacon identifiers associated with the predefined area,
enable transfers of funds from an external account to a wallet managed by the mobile terminal when the mobile terminal is outside of the predefined area, and disable transfers of funds from the external account to the wallet managed by the mobile terminal when the mobile terminal is inside of the predefined area.

2. The system of claim 1, wherein the external account is a user bank account.

3. The system of claim 1, wherein the wallet managed by the mobile terminal is a gaming wallet.

4. The system of claim 3, wherein the computer-executable instructions, when executed by the one or more processors, further cause the one or more processors to enable transfers of funds from the gaming wallet managed by the mobile terminal to a gaming device when the mobile terminal is inside of the predefined area.

5. The system of claim 1, wherein the computer-executable instructions, when executed by the one or more processors, further cause the one or more processors to enable transfers of funds from a gaming wallet managed by the mobile terminal to a gaming device when the mobile terminal is inside of the predefined area.

6. The system of claim 5, wherein:

the wallet managed by the mobile terminal is a main wallet, and the computer-executable instructions, when executed by the one or more processors, further cause the one or more processors to enable transfers of funds from the main wallet to the gaming wallet.

7. The system of claim 1, wherein the wallet managed by the mobile terminal is stored in a player tracking system.

8. A method comprising:

determining whether or not a mobile terminal is within a predefined area based on detection or non-detection, by the mobile terminal, of one or more radio frequency beacon identifiers associated with the predefined area, enabling transfers of funds from an external account to a wallet managed by the mobile terminal when the mobile terminal is outside of the predefined area, and disabling transfers of funds from the external account to the wallet managed by the mobile terminal when the mobile terminal is inside of the predefined area.

9. The method of claim 8, wherein the external account is a user bank account.

10. The method of claim 8, wherein the wallet managed by the mobile terminal is a gaming wallet.

11. The method of claim 10, further comprising enabling transfers of funds from the gaming wallet managed by the mobile terminal to a gaming device when the mobile terminal is inside of the predefined area.

12. The method of claim 8, further comprising enabling transfers of funds from a gaming wallet managed by the mobile terminal to a gaming device when the mobile terminal is inside of the predefined area.

13. The method of claim 12, wherein:

the wallet managed by the mobile terminal is a main wallet, and the method further comprises enabling transfers of funds from the main wallet to the gaming wallet.

14. The method of claim 8, wherein the wallet managed by the mobile terminal is stored in a player tracking system.

15. One or more non-transitory, computer-readable media storing computer-executable instructions which, when executed by one or more processors of a mobile terminal, cause the one or more processors of the mobile terminal to:

determine whether or not the mobile terminal is within a predefined area based on detection or non-detection, by the mobile terminal, of one or more radio frequency beacon identifiers associated with the predefined area, enable transfers of funds from an external account to a wallet managed by the mobile terminal when the mobile terminal is outside of the predefined area, and disable transfers of funds from the external account to the wallet managed by the mobile terminal when the mobile terminal is inside of the predefined area.

16. The one or more non-transitory computer-readable media of claim 15, wherein the external account is a user bank account.

17. The one or more non-transitory computer-readable media of claim 15, wherein the wallet managed by the mobile terminal is a gaming wallet.

18. The one or more non-transitory computer-readable media of claim 17, wherein the computer-executable instructions, when executed by the one or more processors of the mobile terminal, further cause the one or more processors of the mobile terminal to enable transfers of funds from the gaming wallet managed by the mobile terminal to a gaming device when the mobile terminal is inside of the predefined area.

19. The one or more non-transitory computer-readable media of claim 15, wherein the computer-executable instructions, when executed by the one or more processors of the mobile terminal, further cause the one or more processors of the mobile terminal to enable transfers of funds from a gaming wallet managed by the mobile terminal to a gaming device when the mobile terminal is inside of the predefined area.

20. The one or more non-transitory computer-readable media of claim 19, wherein:

the wallet managed by the mobile terminal is a main wallet, and the computer-executable instructions, when executed by the one or more processors of the mobile terminal, further cause the one or more processors of the mobile terminal to enable transfers of funds from the main wallet to the gaming wallet.

* * * * *